United States Patent [19]
Ho et al.

[11] Patent Number: 6,030,551
[45] Date of Patent: Feb. 29, 2000

[54] POLYANILINE-CONTAINING SOLUTION AND METHOD FOR PREPARING THE SAME

[75] Inventors: Ko-Shan Ho, Taipei Hsien; Tar-Hwa Hsieh, Kaohsiung, both of Taiwan

[73] Assignee: Conpoly Technology Co., Ltd., Kaohsiung, Taiwan

[21] Appl. No.: 09/287,824

[22] Filed: Apr. 7, 1999

[51] Int. Cl.$^7$ ............... H01B 1/00; C08G 73/00
[52] U.S. Cl. ............ 252/500; 252/62.2; 525/185; 525/540; 528/422; 528/480; 528/423; 500/540
[58] Field of Search ............ 252/500, 62.2; 525/185, 540; 528/422, 480; 500/540; 136/263

[56] References Cited

U.S. PATENT DOCUMENTS

| | | | |
|---|---|---|---|
| 5,470,505 | 11/1995 | Smith et al. | 252/500 |
| 5,618,469 | 4/1997 | Harlev et al. | 252/500 |
| 5,728,321 | 3/1998 | Abe et al. | 252/500 |
| 5,863,465 | 1/1999 | Kinlen | 252/500 |

FOREIGN PATENT DOCUMENTS

WO 92/22911  12/1992  WIPO .

*Primary Examiner*—Yogendra Gupta
*Assistant Examiner*—Derrick G. Hamlin
*Attorney, Agent, or Firm*—Christie, Parker & Hale, LLP

[57] ABSTRACT

A process for producing a conductive polyaniline is disclosed. The process includes mixing an aniline monomer, a water-immiscible organic solvent, at least one protonic acid doping agent and water together to form an emulsion via agitation, stopping agitation to allow the emulsion to separate into an aqueous phase and a non-aqueous phase, separating the non-aqueous phase from the aqueous phase, and adding an oxidation agent into the non-aqueous phase to carry out polymerization. A non-aqueous in-situ formed transparent polyaniline solution prepared by the process is also disclosed.

12 Claims, No Drawings

POLYANILINE-CONTAINING SOLUTION AND METHOD FOR PREPARING THE SAME

BACKGROUND OF THE INVENTION

1. Field of the Invention

The present invention relates to a polyaniline-containing solution and method for preparing the same, more particularly to an optically transparent polyaniline-containing solution that is formed in-situ upon polymerizing on aniline monomer, and a method for preparing the same.

2. Description of the Related Art

Conductive paints have been widely used for anti-static electrostatic discharge, electromagnetic interference (EMI) shielding, and insulated plastic materials.

One type of the conductive paints is prepared by blending a powdery metal, such as Zn, Ni or Ag, with a resin. However, this type of conductive paint suffers from several disadvantages. First, due to the high density of metal powder present in the conductive paint, the metal powder will tend to sink to the bottom of the conductive paint whenever the agitation of the paint is insufficient or fully stopped. Agitation of the conductive paint is required in order to keep a uniform concentration for the paint during painting. Second, when the coated layer of the conductive paint is dried in an open environment, particles of the metal powder present in the conductive paint tend to be gradually precipitated out and coalesce together, thereby resulting in a gradual decrease in quality. Third, the powdery metals are prone to be oxidized when the paints are exposed to air, and consequently become electro-insulated in the long run. Finally, the cost of using powdery metals in the conductive paints are expensive, and the powdery metals may become harmful to the environment as residual wastes in the plastics which they were blended or coated with.

Polyaniline has emerged as one of the promising conducting polymers and can be used in a variety of applications, such as paint, antistatic protection, electromagnetic protection, electro-optic devices such as liquid crystal devices (LCDs) and photocells, transducers, circuit boards, etc. However, processing of polyaniline into useful products or devices as described above has been problematic because of its insolubility in common solvents.

Typically, polyaniline is produced as solid emeraldine salt from chemical oxidative polymerization in the presence of protonic acids such as HCl and $H_2SO_4$. The solid emeraldine salt is normally precipitated out in the reaction mixture during the polymerization. Hence, this solid salt has to be recovered from the reaction mixture, and subjected to filtering, washing with water and solvent, and drying in order to yield the solid polyaniline for use in the applications described above. The polyaniline obtained in such way is normally insoluble, which hinders the application of the polyaniline.

PCT US92 Patent No. 04167 disclosed the use of functionalized protonic acid in the preparation of conductive polyanilines to induce processability and solubility for the conductive polyanilines in an organic solvent.

Harlev et al., U.S. Pat. No. 5,618,469, disclosed a method for preparing a processable solution of emeraldine salt for use in the preparation of electrically-conductive and optically transparent coatings, and to articles, such as liquid crystal devices and other electro-optic devices. Such method comprises oxidatively polymerizing aniline monomer in the presence of a protonic acid, for example pyruvic acid, to yield a solid emeraldine salt, reacting the solid emeraldine salt with an aqueous ammonium solution to form a solid emeraldine base, and dissolving the emeraldine base in an additional amount of pyruvic acid to form a solution of polyaniline.

Some disadvantages of the method described above are that the emeraldine salt formed in the reaction mixture during the oxidative polymerization is insoluble and precipitated out so that a complex process is needed to transform the salt into a solid emeraldine base which is then dissolved in pyruvic acid to form into a processable solution of polyaniline.

Smith et al., U.S. Pat. No. 5,470,505, disclosed that the emeraldine salt prepared by standard methods of oxidative polymerization of aniline monomer in the presence of a protonic acid can be dissolved in an acid, particularly strong acid such as concentrated $H_2SO_4$, $CH_3SO_3H$, $ClSO_3H$, $CF_3SO_3H$ and $HNO_3$ (70% or fuming). The emeraldine salt (polyaniline) dissolved in one of these acid solutions is then processed into desired articles in the applications.

Abe et al., U.S. Pat. No. 5,728,321, disclosed a solution of polyaniline (dissolved in an aprotic polar solvent, such as N-methyl-2-pyrolidone) in doped state can be obtained by a method using a specific protonic acid, such as hydrofluoroboric acid, hydrofluorophosporic acid, perchloric acid, or any other organic acids having acid dissociation constant pKa values of less than 4.8, as dopants in the oxidative polymerization of aniline monomer. Also, the polyaniline obtained according to the above method, which is insoluble in an organic solvent, can be dissolved in an aprotic polar solvent in an undoped state. The undoping of doped polyaniline in order to permit the polyaniline to be soluble in organic solvent is burdensome and increases production cost.

Traditional methods of preparation of polyaniline in a processable form, including the prior arts mentioned above, have to go through the processes of recovering, filtering, washing, and drying of the reaction product to obtain the solid polyaniline due to the insolubility of the polyaniline formed in the reaction mixture, and need additional processes, such as transforming the emeraldine salt into emeraldine base and dissolving the solid polyaniline or emeraldine base in a solvent, to obtained the desired solution of polyaniline.

SUMMARY OF THE INVENTION

Therefore, it is an object of the present invention to overcome the aforementioned disadvantages of the prior arts and to provide a process of producing a processable solution of polyaniline in which an acid-doped polyaniline produced by oxidative polymerization of an aniline monomer is well dissolved in a non-aqueous phase of the reaction mixture of the polymerization, thereby eliminating the need to use additional solvent for dissolving the polyaniline, and/or the need to undope and redope the solid product of polymerization. The process provides a by-product which comprises a polyaniline-containing aqueous solution with suspended fine particles. Both of the non-aqueous and aqueous solutions of the polyaniline are formed in-situ, and can be used directly as a composition for forming cast products, such as films, fibers, etc., and for blending with other polymers and paint compositions.

Another object of this invention is to provide a process of producing a polyaniline from an aniline monomer in which no insoluble solid substance is generated after oxidative polymerization and which dispenses with the need to filter, wash, dry, and optionally grind the solid substance.

It is a further object of the present invention to provide a process for preparing an in-situ formed optically transparent polyaniline solution.

In one aspect of the present invention, a process for producing a conductive polyaniline comprises: mixing an aniline monomer, a water-immiscible organic solvent, at least one protonic acid doping agent and water together to form an emulsion via agitation; stopping agitation to allow the emulsion to separate into an aqueous phase and a non-aqueous phase; separating the non-aqueous phase from the aqueous phase; and adding an oxidation agent into the non-aqueous phase to carry out polymerization of the aniline monomer.

In another aspect of the present invention, a non-aqueous in-situ formed transparent polyaniline solution comprises a protonic acid-doped polyaniline prepared by the steps of: mixing an aniline monomer, a water-immiscible organic solvent, at least one protonic acid doping agent and water together to form an emulsion via agitation; stopping agitation to allow the emulsion to separate into an aqueous phase and a non-aqueous phase; separating the non-aqueous phase from the aqueous phase; and adding an oxidation agent into the non-aqueous phase to carry out polymerization of the aniline monomer.

DETAILED DESCRIPTION OF THE INVENTION

This invention will now be described in greater detail in the following detailed description including the Examples provided herein.

As stated above, the present invention is primarily aimed at providing a process wherein a protonic acid-doped polyaniline produced by an oxidative polymerization is dissolved in a non-aqueous phase or an oil phase of a reaction mixture so that no solid substance is formed upon polymerization. The polyaniline is highly soluble in the non-aqueous phase. The high solubility of the polyaniline is obtained by adjusting the ratio of the acid dopant and by carefully selecting organic solvents.

The polyanilines produced according to the process of this invention may be prepared from the polymerization of an unsubstituted or substituted aniline monomer having the following formula:

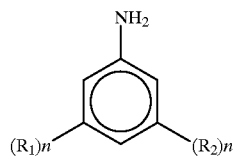

wherein, $R_1$ and $R_2$ can be any suitable substituent, including alkyl, alkoxy, alkylsulfonyl, arylsulfonyl, halogen, alkoxycarbonyl, alkythio, alkylsulfuryl, cycloalkyl, sulfonic or carboxylic substituted alkyl such as p-aminophenyl sulfuric acid and p-aminophenyl carboxylic acid, or aryl substituents; and n is an integer from 0 to 5.

The organic solvent used in the process of this invention is preferably selected from the group consisting of substituted and unsubstituted aromatic compounds such as benzene, toluene, p-xylene, m-xylene, naphthalene, ethylbenzene, styrene, liquid esters such as ethyl acetate, n-propyl acetate, iso-propyl acetate, n-butyl acetate, iso-butyl acetate, n-pentyl acetate, cyclic compounds such as cyclic hexane, methyl cyclohexane, aminocyclohexane, higher ketones such as hexanone, butanone, pentanone and the like, heterocycyclic compounds such as tetrahydrofuran, hexahydropyridine, substituted and unsubstituted phenolic compounds such as phenol, m-cresol, p-cresol, chlorophenol, p-isobutyl phenol, p-tert-butyl-phenol, p-sulfonyl phenol, halogenated aromatic compounds such as chlorobenzene, o-dichlorobenzene, m-dichlorobenzene, p-dichlorobenzene, and mixtures thereof, and more preferably from toluene, xylene, benzene, n-butylacetate, methylcyclohexane, and dimethyl cyclohexane, particularly from toluene.

Conventional protonic acids are suitable for use as doping agent in the process according to this invention. Preferably, the doping agent can be selected from the group consisting of HCl, $H_2SO_4$, boric acid, phosphoric acid, selenic acid, hydrogen sulfate, hydrogen persulfate, toluene sulfonic acid, benzene sulfonic acid, xylene sulfonic acid (XSA), and dodecyl benzene sulfonic acid (DBSA), more preferably from HCl, toluene sulfonic acid, benzene sulfonic acid, xylene sulfonic acid (XSA), and dodecyl benzene sulfonic acid (DBSA), particularly from HCl, DBSA, and xylene sulfonic acid (XSA).

The preferred oxidative agent used in the process according to this invention may be selected from the group consisting of ammonium peroxysulfate (APS), persulfated salts such as ammonium persulfate, potassium persulfate, perchlorated salts such as potassium perchlorate, chlorinated salt such as potassium chlorinate, iodonated salt such as potassium iodonate, chlorinated iron such as ferric chloride, fuming sulfuric acid, and ozone, particularly from APS.

The polymerization temperature in the process of this invention may vary within a range from 25 to 60° C. It has been observed, however, that the preferred temperature is about 40° C.

The polymerization is preferably conducted at a pH value of below 1.

The following Examples are preferred embodiments of this invention.

EXAMPLE 1

10 g of concentrated HCl, 5 g of DBSA, and 40 g of water were introduced in a flask to make an aqueous solution. 5 g of APS was dissolved in 50 g of water in a beaker to prepare an oxidizing aqueous solution. An aniline solution which was prepared from 40 g of toluene and 2 g of aniline was added to the flask. The mixture inside the flask was stirred vigorously to form an emulsion. The emulsion was then allowed to settle into an aqueous phase and a non-aqueous phase or oil phase after the stirring was stopped. The non-aqueous phase was separated from the aqueous phase. The APS aqueous solution was added drop-wise to the non-aqueous phase under stirring for polymerization. The reaction mixture formed into another emulsion under stirring. The reaction took place at room temperature for 1 to 2 hrs. The pH of the emulsion is controlled to below 1. After the polymerization, the stirring was stopped, and the emulsion settled into a lower and an upper phase. The upper phase, which contains the soluble polyaniline, exhibited a transparent property. No solid precipitate can be observed in the upper phase with naked eyes. The polyaniline solution obtained from the polymerization described above can be used directly for applications, such as in the manufacture of conductive paints.

EXAMPLE 2

Preparation of polyaniline in this example is the same as Example 1, except that 12 g of DBSA, 200 g of HCl and 200 g of water were prepared in the flask, 36 g of aniline was dissolved in 120 g of toluene, and 12 g of APS was dissolved in 120 g of water. A transparent solution in the upper phase was obtained after polymerization. No solid precipitate was observed in the solution.

EXAMPLE 3

Preparation of polyaniline in this example is the same as Example 1, except that 72 g of DBSA, 240 g of HCl and 1200 g of water were prepared in the flask, 216 g of aniline was dissolved in 720 g of toluene, and 72 g of APS was dissolved in 720 g of water. A transparent solution in the upper phase was obtained after polymerization. No solid precipitate was observed in the solution.

EXAMPLE 4

Preparation of polyaniline in this example is the same as Example 1, except that 1 g of xylene sulfonic acid and 3.5 g of DBSA were added into the aniline solution in the flask.

With the invention thus explained, it is apparent that various modifications and variations can be made without departing from the spirit of the present invention. It is therefore intended that the invention be limited only as recited in the appended claims.

We claim:

1. A process for producing a conductive polyaniline, comprising the steps of:

agitating an aniline monomer, a water-immiscible organic solvent, at least one protonic acid doping agent and water together to form an emulsion;

stopping agitation to allow said emulsion to separate into an aqueous phase and a non-aqueous phase;

separating said non-aqueous phase from said aqueous phase; and adding an oxidation agent into said non-aqueous phase to carry out polymerization of the aniline monomer, another emulsion being formed after the oxidation agent is added, so that an in-situ formed transparent non-aqueous polyaniline solution is obtained.

2. The process of claim 1, further comprising the step of introducing an additional amount of said doping agent into said non-aqueous phase for controlling the pH value of said non-aqueous phase before polymerization.

3. The process of claim 1, wherein said organic solvent is selected from the group consisting of benzene, toluene, p-xylene, m-xylene, o-xylene, naphthalene, ethylbenzene, styrene, ethyl acetate, n-propyl acetate, iso-propyl acetate, n-butyl acetate, iso-butyl acetate, n-pentyl acetate, cyclic hexane, methyl cyclohexane, aminocyclohexane, hexanone, butanone, pentanone, tetrahydrofuran, hexahydropyridine, phenol, m-cresol, p-cresol, chlorophenol, p-isobutyl phenol, p-tert-butyl-phenol, p-sulfonyl phenol, chlorobenzene, o-dichlorobenzene, m-dichlorobenzene, p-dichlorobenzene, and mixtures thereof.

4. The process of claim 1, wherein said organic solvent is toluene.

5. The process of claim 1, wherein said doping agent is selected from the group consisting of HCl, $H_2SO_4$, boric acid, phosphoric acid, selenic acid, hydrogen sulfate, hydrogen persulfate, dodecyl benzene sulfonic acid (DBSA), toluene sulfonic acid, benzene sulfonic acid, and xylene sulfonic acid (XSA).

6. The process of claim 4, wherein said doping agent includes HCl and DBSA.

7. The process of claim 6, wherein said doping agent further includes XSA.

8. The process of claim 1, wherein said oxidation agent is selected from the group consisting of ammonium peroxysulfate (APS), ammonium persulfate, potassium persulfate, potassium perchlorate, potassium chlorinate, potassium iodonate, ferric chloride, fuming sulfuric acid, and ozone.

9. The process of claim 7, wherein said oxidation agent is APS.

10. The process of claim 9, wherein said non-aqueous phase has a pH value of below 1.

11. The process of claim 1, wherein the weight ratio of said aniline monomer to said doping agent is in a range of from 1:1 to 100:1.

12. The process of claim 1, further comprising the step of adding said oxidative agent to said aqueous phase to carry out polymerization.

* * * * *